United States Patent [19]

Scherrer et al.

[11] 4,284,143
[45] Aug. 18, 1981

[54] SYSTEM FOR THE REMOTE CONTROL, THE MAINTENANCE OR THE FLUID INJECTION FOR A SUBMERGED SATELLITE WELL HEAD

[75] Inventors: Norbert Scherrer, Saint Marcel; Pierre Ory, Lepecq, both of France

[73] Assignee: Societe Europeenne de Propulsion, Puteaux, France

[21] Appl. No.: 58,861

[22] Filed: Jul. 19, 1979

Related U.S. Application Data

[63] Continuation-in-part of Ser. No. 936,783, Aug. 15, 1978, abandoned.

[30] Foreign Application Priority Data

Mar. 22, 1979 [GB] United Kingdom ............... 10118/79

[51] Int. Cl.³ .................... E21B 33/068; E21B 33/072
[52] U.S. Cl. ..................................... 166/350; 166/357; 166/65 R; 285/263
[58] Field of Search ............... 166/350, 355, 368, 369, 166/365, 364, 335, 363, 362, 352, 262, 66 R, 66, 357; 137/236; 405/189, 190, 191; 285/223, 261, 263

[56] References Cited

U.S. PATENT DOCUMENTS

| | | | |
|---|---|---|---|
| 3,313,345 | 4/1967 | Fischer .................................. | 166/355 |
| 3,313,358 | 4/1967 | Postlewaite et al. ............ | 166/355 X |
| 3,400,730 | 9/1968 | Anderson .............................. | 137/236 |
| 3,408,822 | 11/1968 | Chate et al. ...................... | 166/356 X |
| 3,503,443 | 3/1970 | Blanding et al. ...................... | 166/357 |
| 3,545,541 | 12/1970 | De Vries ............................ | 166/368X |
| 3,680,895 | 8/1972 | Herbert et al. ........................ | 285/223 |
| 3,865,142 | 2/1975 | Begun et al. ........................... | 137/236 |
| 3,952,526 | 4/1976 | Watkins et al. ........................ | 166/350 |
| 3,957,079 | 5/1976 | Whiteman ............................ | 166/368 |
| 4,068,868 | 1/1978 | Ohrt ..................................... | 285/223 |
| 4,126,183 | 11/1978 | Walker ............................... | 166/364 X |

Primary Examiner—James A. Leppink
Assistant Examiner—Richard E. Favreau
Attorney, Agent, or Firm—Bill B. Berryhill

[57] ABSTRACT

System for the remote control, the maintenance or the fluid injection for a submerged satellite well head comprising a platform equipped with equipment usable for the remote control, maintenance or fluid injection for the well head and located substantially perpendicular to the well head, at least one pipeline connecting the platform to the well head, a control device located on the well head or in the immediate vicinity of the latter, and at least one remote control line connecting the platform to the remote control device, wherein the platform is on the surface and the pipeline is connected to the platform by a connector and to the well head by a spherical articulation equipped with a flexible joint.

8 Claims, 12 Drawing Figures

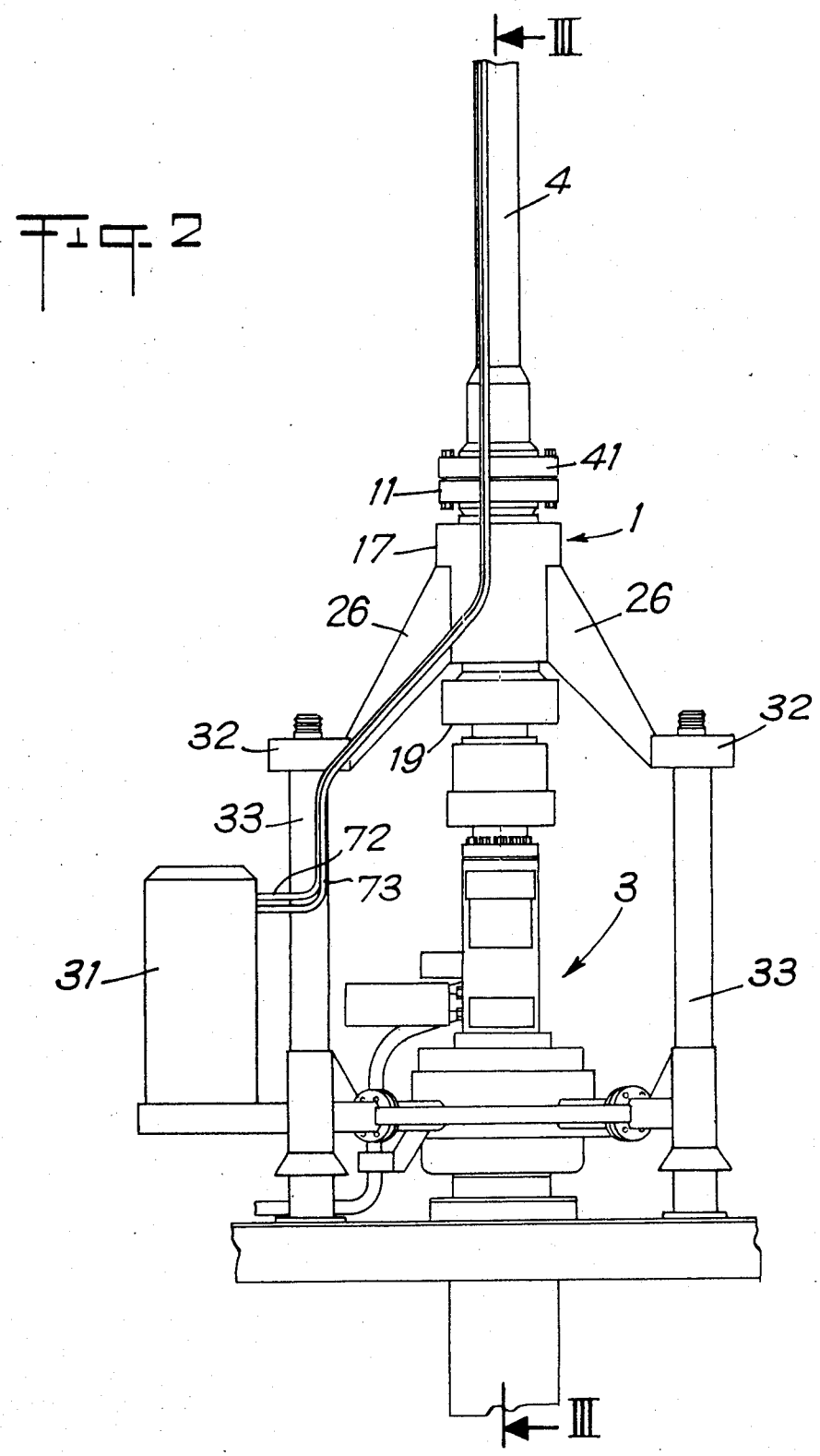

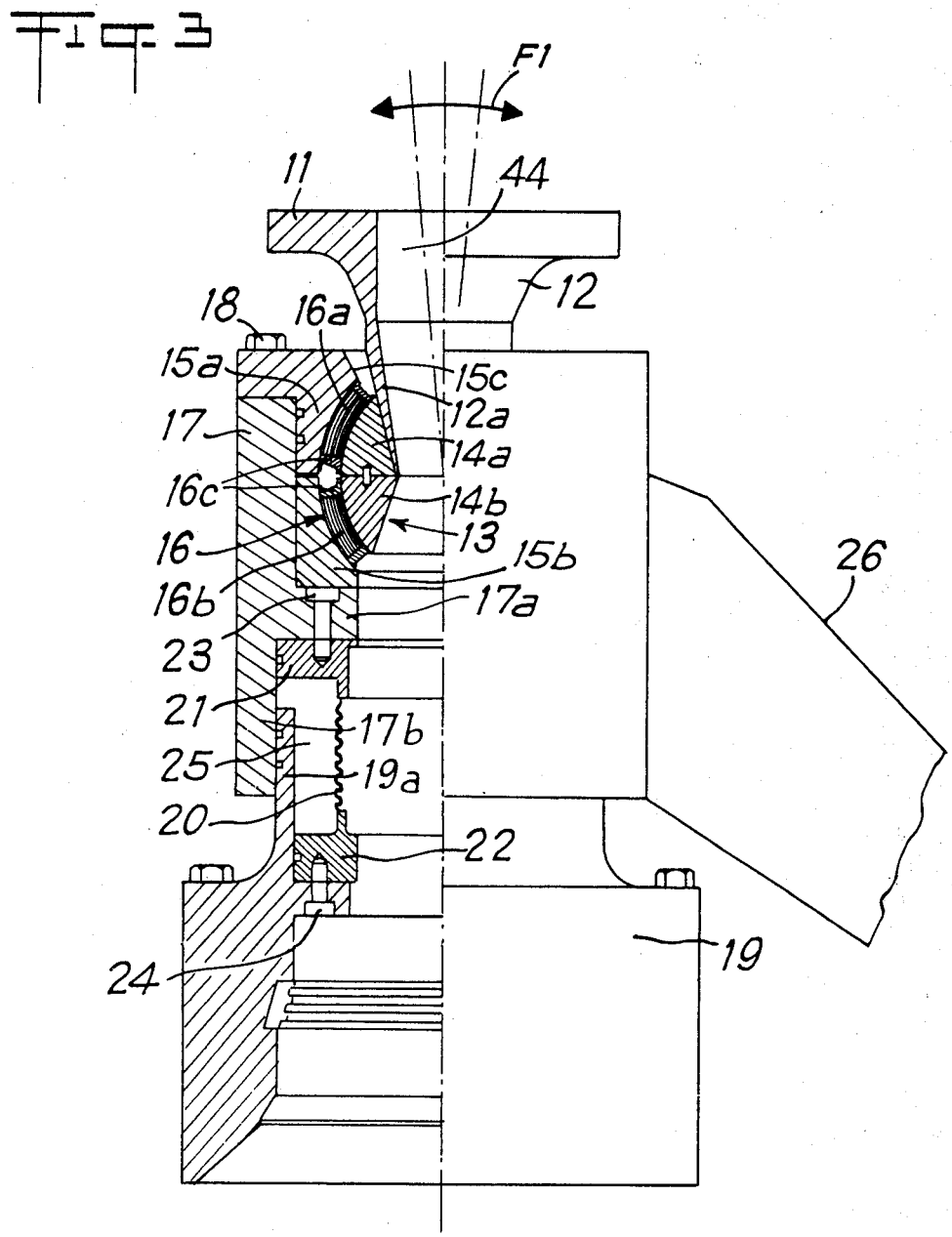

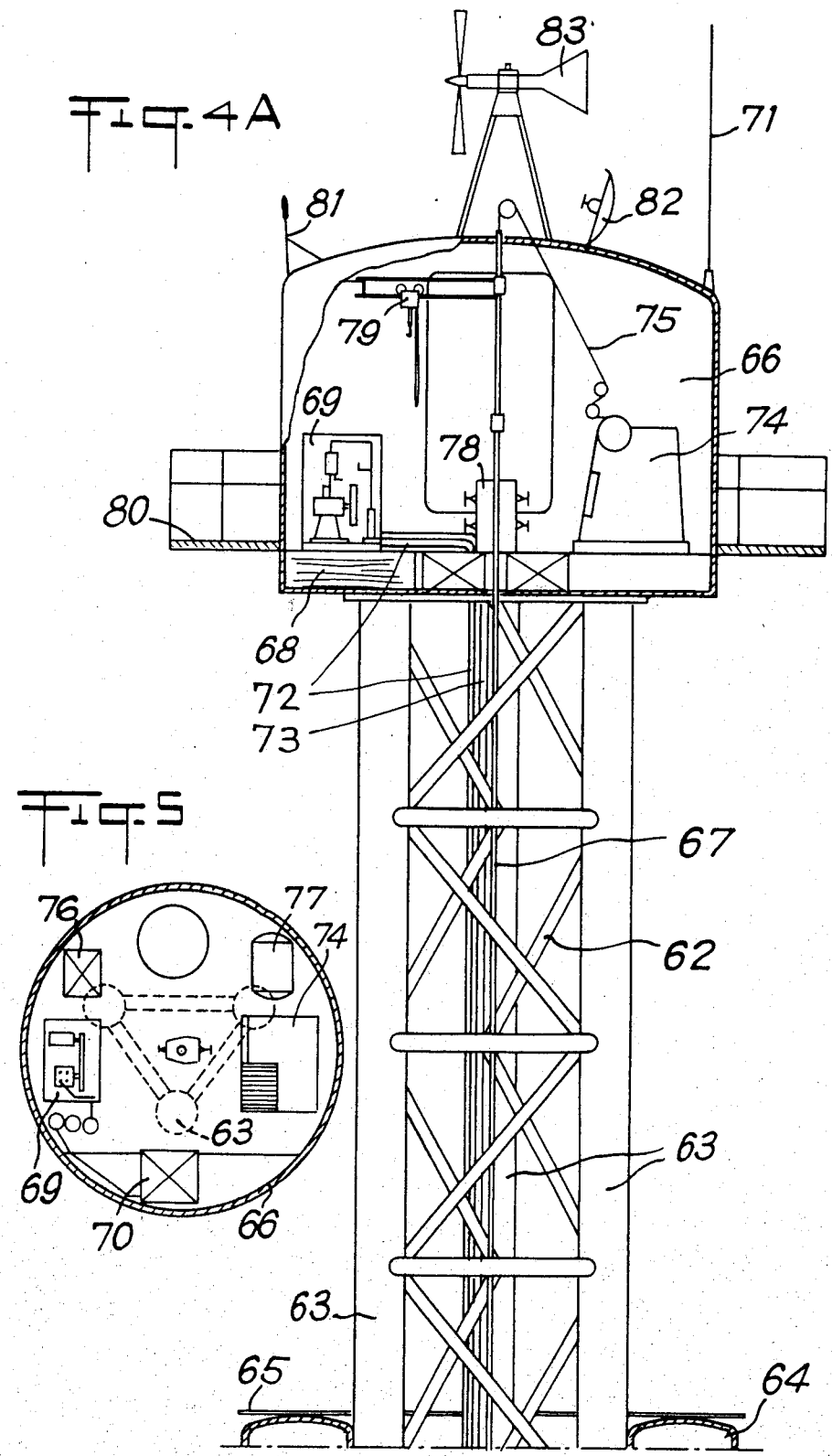

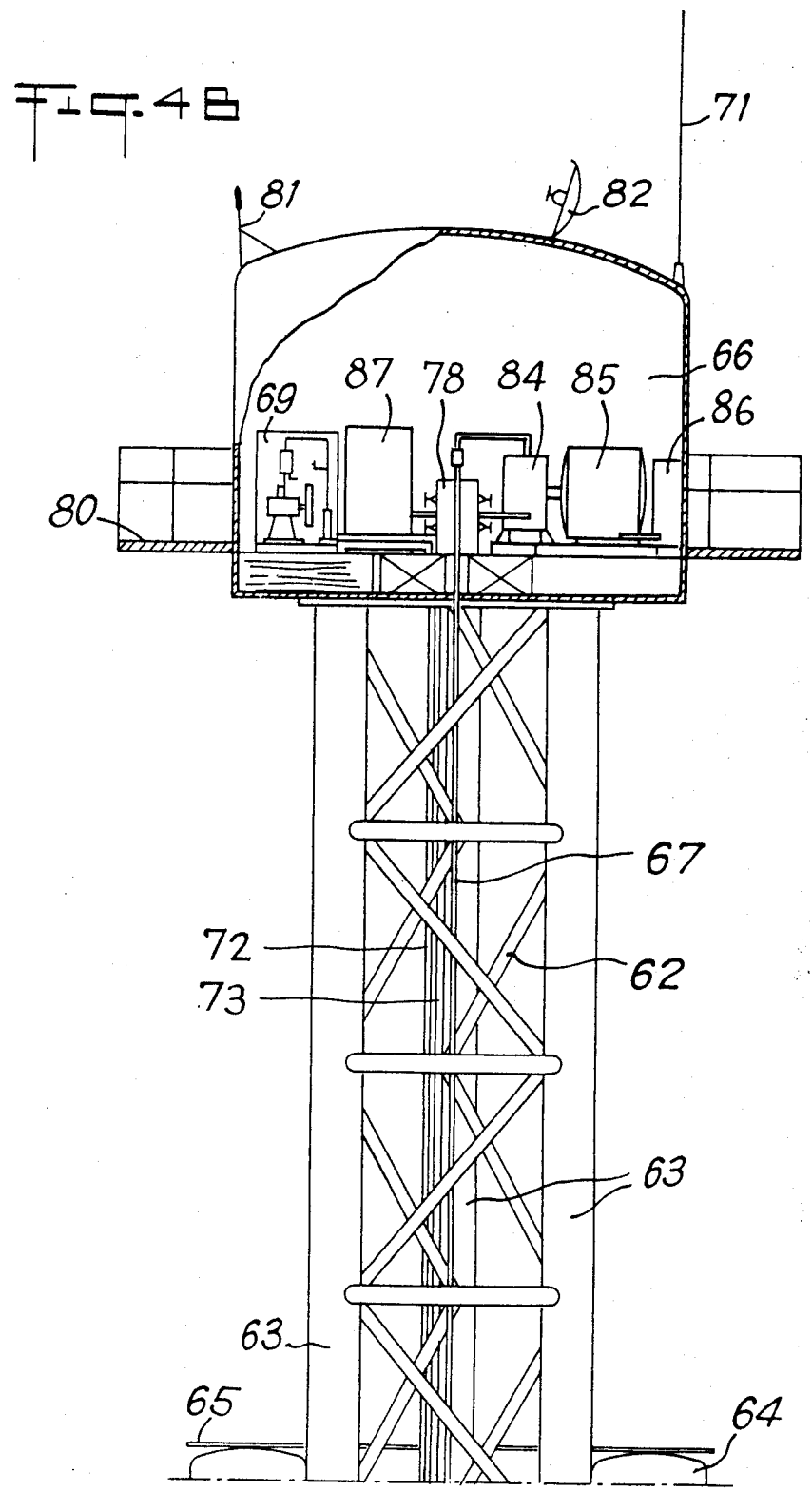

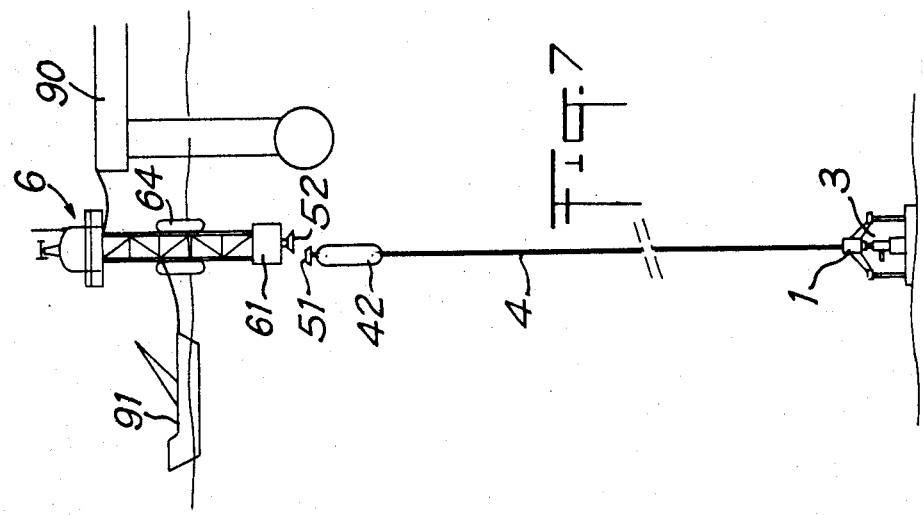
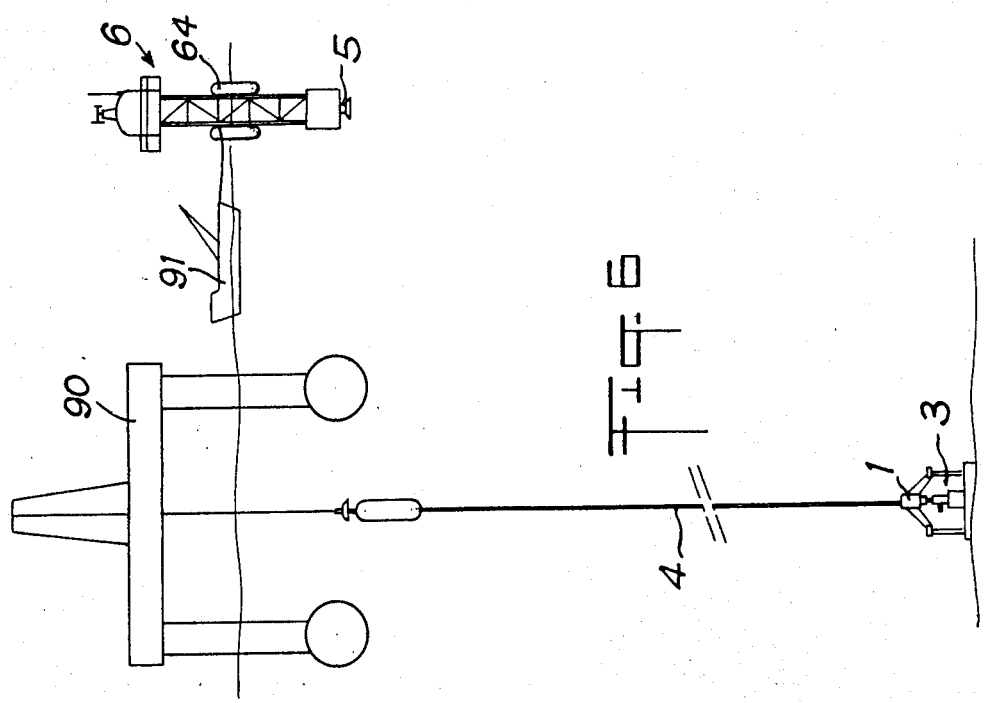

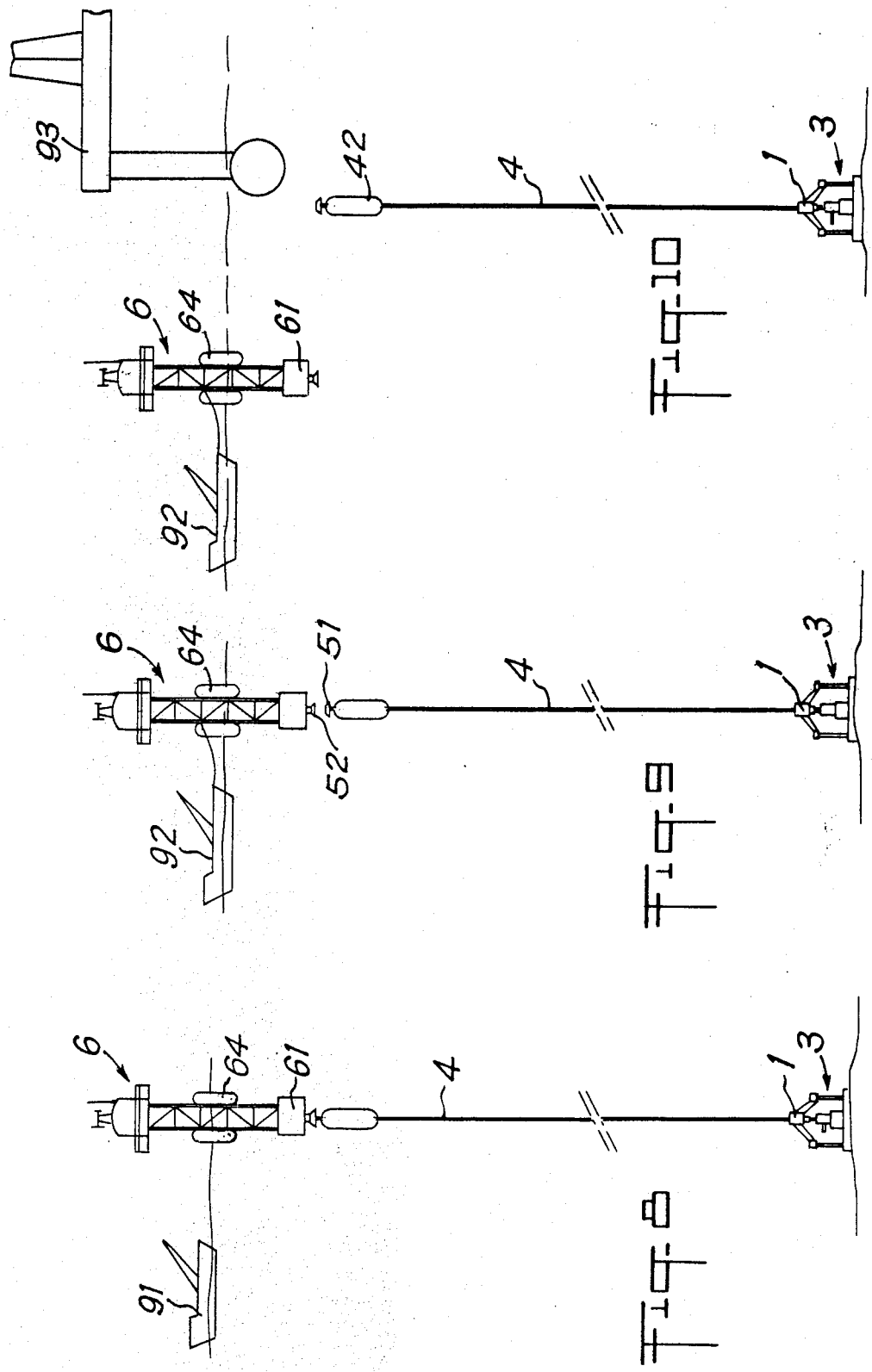

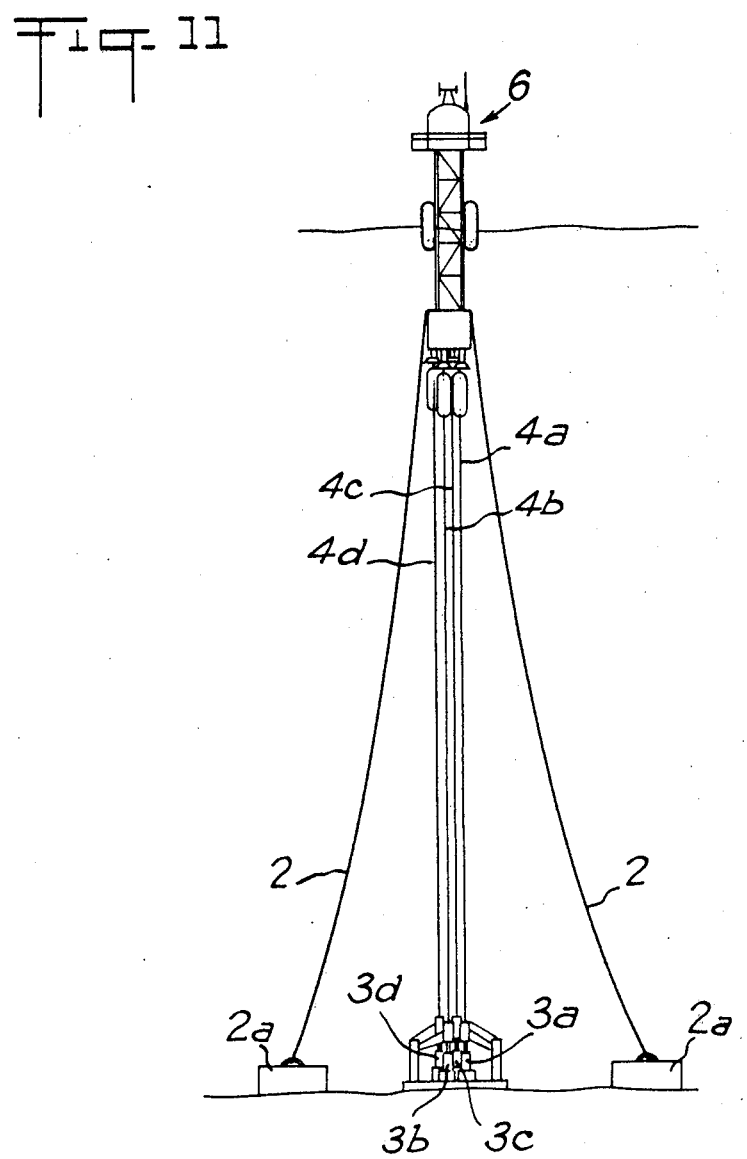

SYSTEM FOR THE REMOTE CONTROL, THE MAINTENANCE OR THE FLUID INJECTION FOR A SUBMERGED SATELLITE WELL HEAD

This application is a continuation-in-part of our application Ser. No. 936,783 filed on Aug. 15, 1978 and now abandoned.

BACKGROUND OF THE INVENTION

The present invention relates to a system for the remote control, maintenance or fluid injection for a submerged satellite well head, particularly a submerged head for a satellite producing oil well or for a satellite well used for stimulating the oil-field.

At present it is standard procedure to remotely control submerged satellite well heads from a central production storage station or platform. Remote control lines are then used which convey the necessary electrical or hydraulic energy from the central platform to the sea bed and then to the satellite well heads on the sea bed. When intervention is necessary on the well head to carry out measurements or maintenance a boat equipped with the necessary equipment is used.

The difficulties involved in conveying remote control energy over relatively large distances on the sea bed, the impossibility of rapidly being able to directly work on the well heads and the relatively high cost of using special boats for this work constitute serious disadvantages.

To obviate these disadvantages, French Pat. No. 1 506 300 and its Addition 2 165 811 propose the use of a system of the type having a platform fitted with equipment usable for the remote control and maintenance of the well head and located substantially perpendicular to said well head, by means of a pipe connecting the platform to the well head, a control device located on the well head or in the immediate vicinity thereof and at least one remote control line connecting the platform to the remote control device.

In this known system the platform is submerged at a limited depth, so that it is not subject to the action of swell, waves and surface currents. Work can only be carried out on the well from the platform after fitting at least one energy transmission line between platform and surface boat.

Therefore this system requires on the one hand the provision on the platform of equipment which, without any danger of damage or deterioration, can withstand permanent immersion and on the other the presence of divers for any intervention.

It is also well known to stimulate an oil-field by permanently or intermittently injecting fluids such as water or chemical products through auxiliary or satellite wells. The fluids are fed to the stimulating satellite wells through submarine ducts, the fluid source and the energy delivering means necessary for the injection process being located on a central production platform.

This known system necessitates the installation and maintenance of a large network of expensive ducts. Due to the length of the ducts, the energy delivering means, in particular the pumps, must be dimensioned in order to overcome the load losses along the ducts.

BRIEF SUMMARY OF THE INVENTION

The object of the present invention is to provide a system of the type hereinbefore by means of which it is not necessary to provide long submarine ducts or equipment having to withstand permanent immersion or the use of divers, whereby said system permits a remote control and rapid working on the satellite well, whilst necessitating no special boat.

According to the invention this object is achieved in that the platform is on the surface and the pipe is connected to the platform by a connector and to the satellite well head by a spherical articulation equipped with a flexible joint.

Thus, the remote control means can be brought to the surface perpendicular to the well and the measuring and maintenance operations can be performed rapidly and at a greatly reduced cost, because it is merely necessary to use an inexpensive small boat.

The connection of the pipe to the well head by means of a flexible joint permits relatively large angular displacements of the platform.

According to a special feature of the system according to the invention the articulation is mounted so that it slides vertically relative to the well head and is rigidly connected to the well structure.

Thus, any repercussion on the well head of loads and stresses acting superficially on the platform is prevented by said loads and stresses being taken up by the actual foundations of the well.

According to another special feature of the system according to the invention the platform has a remote control energy source and a system for receiving remote control orders connected to the remote control line in such a way as to remotely control the well head as a function of the remote control signals received by the order reception circuit.

The remote control of several satellite well heads can be effected from a central station without it being necessary to have on the sea bed an energy distribution network.

BRIEF DESCRIPTION OF THE DRAWINGS

The invention will be described in greater detail hereinafter relative to preferred non-limitative embodiments and with reference to the attached drawings, wherein show:

FIG. 2 a more detailed view on a larger scale of the lower part of the system illustrated in FIG. 1.

FIG. 3 a partial view on a larger scale and in half-section in accordance with the plane III—III of FIG. 2.

FIGS. 4A and 4B diagrammatic views on a larger scale of two embodiments of the platform of the system illustrated in FIG. 1.

FIG. 5 a part diagrammatic plan view illustrating the location of various pieces of equipment on the platform shown in FIG. 4.

FIGS. 6 to 10 successive phases of installing and removing the system according to the invention.

FIG. 11 a very diagrammatic overall view of a variant of the system according to the invention.

DETAILED DESCRIPTION OF THE PREFERRED EMBODIMENTS

Figure 1:
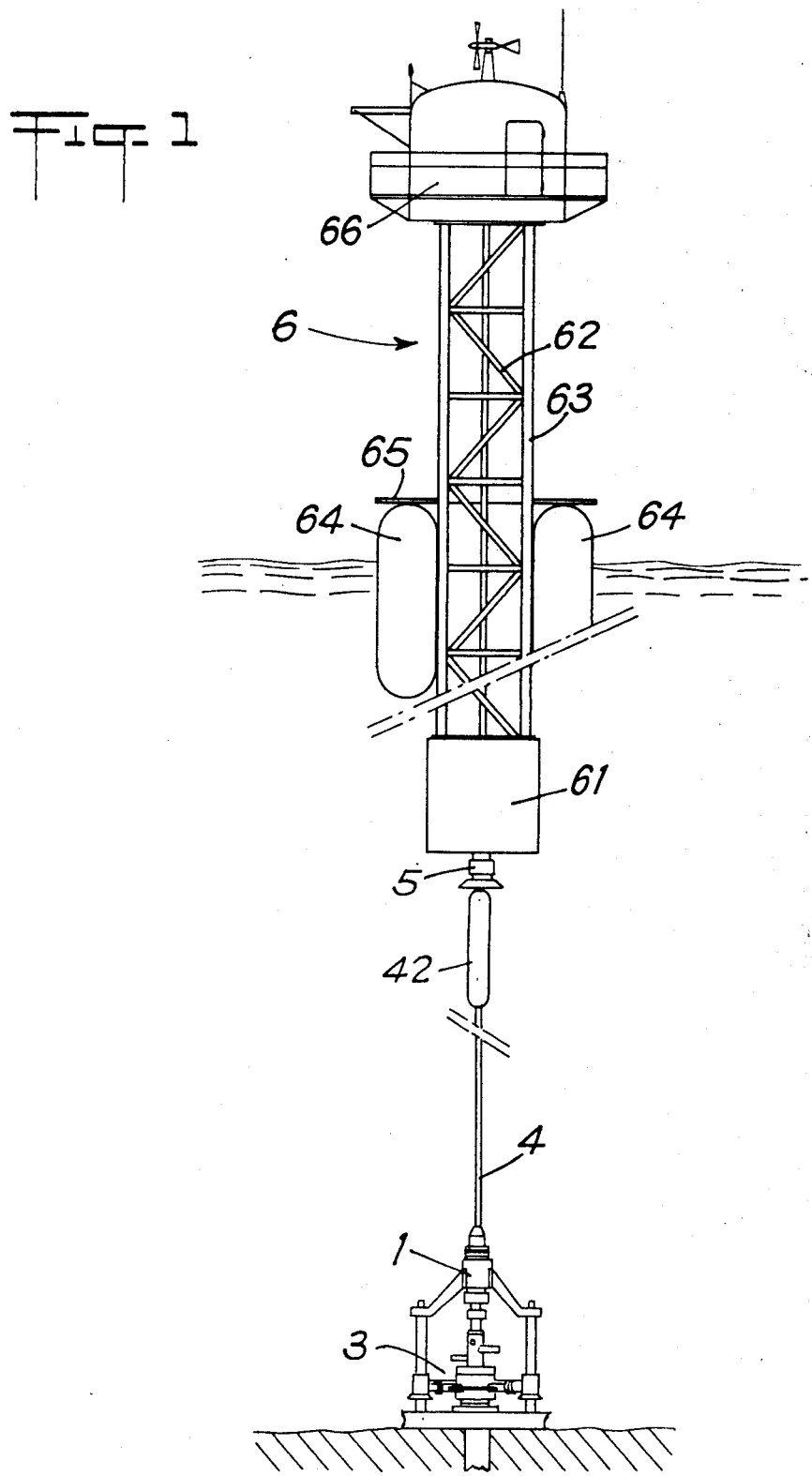
FIG. 1 an overall diagrammatic view of a system according to the invention.

The system illustrated in FIG. 1 has from bottom to top a connecting device 1 with an articulation permitting the attachment of the system to a submerged satellite well head structure 3, at least one vertical self-supporting pipeline 4 connected by its lower end to connecting device 1, a connector 5 mounted at the upper end of pipeline 4 and a surface platform 6.

The connecting device 1 must permit inclinations and vibrations or oscillations of the platform as a function of the surface conditions, whereby said inclinations can reach 10° relative to the vertical. If necessary, for example when used in difficult sea areas the platform is anchored by means of dead weights resting on the sea bed and connected by cables to the platform.

Device 1 will be described in detail with reference to FIGS. 2 and 3.

The base of pipeline 4 is connected to device 1 by means of clamps 41 and 11 which are assembled in an integral manner respectively with pipeline 4 and a sleeve 12 constituting the movable part of a spherical articulation 13.

Articulation 13 comprises two half-ball joints 14a and 14b fixed to sleeve 12 and mounted within two spherical half-shells 15a, 15b with the interpositioning of a spherical flexible joint 16 (FIG. 3).

The half-shells 15a, 15b are mounted in a cylindrical recess formed in the upper part of a connecting sleeve 17 and bounded at the bottom by an inner annular shoulder 17a of said sleeve. The upper half-shell 15a is fixed by screws 18 to the upper surface of sleeve 17.

The flexible joint 16 is in two parts 16a, 16b, each constituted by a stack of a metallic material, for example steel, and an elastic material, for example rubber, which adhere to one another. The terminal layers of the stack forming half-joint 16a are respectively integral with the half-ball joint 14a and the half-shell 15a, whilst the terminal layers of half-joint 16b are respectively integral with half-ball joint 14b and half-shell 15b.

The various layers of the half-joint 16a, 16b are disposed in accordance with surfaces which revolve about the vertical axis of the articulation and form parts of the spherical surfaces. The deformation of the half-joint 16a, 16b parallel to the layers constituting the same is limited by the presence of reinforcing rings 16c disposed along the edges of the half-joints.

The structure of the flexible joint 16 permits a limited angular movement, for example ±10° relative to the vertical (cf. arrows F1 and FIG. 3). This angular amplitude is limited by abutment between the lower truncated-cone shaped portion 12a of sleeve 12 and a chamfer 15c of the upper half-shell 15a.

Other embodiments of a spherical flexible joint could be adopted. In particular reference could be made to French patent application No. 76 34009 which describes a flexible spherical joint, which is improved relative to joint 16 described hereinbefore.

The lower tubular portion 17b of sleeve 17 slides vertically on the upper tubular portion 19a of a reentry connector 19 on the well head.

A bellows 20 in the form of a cylindrical sleeve ensures the sealing between sliding members 17 and 19. The bellows 20 is fixed by its upper and lower ends to rings 21 and 22 fixed by screws 23, 24 beneath shoulders 17a of sleeve 17 and to connector 19. A compensation chamber 25 surrounds bellows 20 in order to bring the latter in equi-pressure when communication with the inside of the well is controlled.

In the case of a satellite producing oil well, the well head 3 is of a conventional nature (FIG. 2) and has first remotely controllable valves for establishing or interrupting communication between the well and the production draining pipe or pipes connected to a central production station or platform. Second remotely controllable valves make it possible to establish for the purpose of maintenance or measurements the communication between pipeline 4 and the well by a central vertical passage which is substantially aligned with the production tube of the well and traversing sleeve 12, half-ball joints 14a, 14b, sleeve 17 and connector 19. The operation of the various valves is brought about by a remote control pod 31 fixed to the well head structure and connected to the valves by not shown control pipes.

The sliding installation between connecting device 1 and well head 3 permits an axial mechanical disengagement between said two members in such a way that there are no repercussions on the well head due to the stresses transmitted by pipeline 4.

These stresses could be transmitted to the actual foundations of the well by providing a rigid mechanical connection between the well head structure and the fixed part of the articulation of connecting device 1. Thus, rigid arms 26 connect connecting sleeve 17 to connectors 32 mounted on columns 33 forming part of the well head structure.

Pipeline 4 has a diameter which is adapted to that of the well production tube which is substantially in its alignment and is dimensioned in such a way that it withstands the stresses and loads transmitted by the surface platform.

Floats 42 (FIG. 1) are fixed to pipeline 4 to make the latter self-supporting (positive buoyancy).

The connection between pipeline 4 and platform 6 is realized by a hydraulically operable connector 5. A cone reentry system 51, 52 carried by pipeline 4 and the lower end of the platform (FIGS. 7 and 9) is provided.

The connector is located at a limited depth, for example a few dozen meters. Preferably, the connector 5 comprises, for example in its lower portion supporting the cone 51 and connected to the top of the pipeline 4, a flexible joint (not shown) which may be identical to the above described joint 16. The connection and disconnection of the platform will be explained in greater detail relative to FIGS. 6 to 10.

Platform 6 has from bottom to top a ballast compartment 61 beneath which is fixed connector 5, a lattice structure 62 interconnecting a plurality of vertical members 63 (three in the illustrated example), buoyancy compartment 64 located level with the water line and whereof some are ballastable, a boarding platform 65, an upper working compartment 66 and a tube 67 which at the top extends pipeline 4 upto compartment 66.

Working compartment 66 (FIGS. 4A and 5) is protected at a diameter of a few meters and has equipment serving for the remote control of the well. All the specific equipment permitting working on the cable in the well are brought together on the platform, but do not include the power supply necessary for this work.

A hydraulic supply tank 68, a hydraulic power unit 69 with a device 70 for receiving remote control orders from the electrical batteries and externally and above compartment 66 a receiving and transmitting antenna 71 are provided for remote control purposes. The remote control unit 69 is connected to remote control pod 31 by a remote control line having one or more flexible tubes 72, 73 (only shown in FIG. 2) which may or may not be associated with pipeline 4.

For measuring and maintenance work requiring the introduction into the well of equipment or tools suspended on the end of a cable, a winch 74 is provided for manipulating a cable 75 in tube 67 and pipeline 4, a chamber for introducing tools into tube 67, an oil-water separation unit 76 and purging equipment 77 for purging pipe 4 and tube 67 when work in the well is at an end. A conventional safety device 78 is mounted at the top of tube 67 to prevent gushing under pressure of the oil when working in the well.

The above equipment is supplemented, particularly within compartment 66, by a handling pulley block 79 and fire safety and emergency evacuation devices and externally of compartment 66 by an access platform 80 and in the upper part light and sound signalling means 81, a radar reflector 82 and an electric power generator, for example a wind-driven generator 83 or solar panels.

Generator 83 may be used for charging the electrical batteries used for remote control purposes.

An advantageous feature of the system according to the invention is that remote control can take place from a distance, for example acoustically or by radio, for different well heads, whilst retaining the remote control energy source close to each well. Antenna 71 may also be used for transmitting data concerning the area round platform 6 or the state of remote control unit 69.

When it is desired to carry out work necessitating the introduction to the well of equipment or tools suspended on the cable of winch 74 a relatively powerful energy supply source and the necessary personnel are required. Preferably use is then made of the electrical power supply on board the boat used for servicing the platform. Preferably the effluents recovered during working in the well are returned to this boat.

It should be noted that in order to prevent all risks, access to the well during working within the same should preferably take place from the outside of compartment 66.

In the case where several satellite well heads are grouped on the sea bed (FIG. 11), for example in the case where there are several divergent drillings on the sea bed, the system according to the invention has a single surface platform 6 connected to the different well heads 3a, 3b, 3c, 3d by special self-supporting pipes 4a, 4b, 4c, 4d. Each pipe is then connected to the platform by a separate connector and to the corresponding well head by an articulation with a special flexible joint as described hereinbefore. The different articulations can be connected mechanically to the same structure.

FIG. 11 also shows a system for anchoring the platform by cables 2 and dead weights 2a resting on the sea bed.

According to a variant of the system according to the invention a remote control pod 31 of the type described in French patent application 78 07048 filed on March 10th 1978 by the present Applicant is used, whereby the pod may or may not be equipped with a recall buoy.

Preferably a permanent guideline is established between the remote control pod and the surface in order to facilitate, if necessary, the raising of the pod for repairs or changes, followed by the lowering thereof of to the sea bed. Advantageously this permanent guideline can also be used as an electrical measuring line for transmitting to the surface the results of measurements performed on the sea bed.

In the preceding description, a system intended for the remote control and maintenance of satellite oil producing wells has been considered.

The system according to the invention is also usable for injecting fluids in a satellite well in order to stimulate the oil field.

In this last case, the working compartment 66 (FIG. 4B) comprises at least one injection pump assembly 84 with its accessories, the energy being generally delivered by at least a thermic source, for example a Diesel motor 85. The structure of the platform is adapted for containing the tanks for the different fluids: fuel tank 86 for the motor, a tank 87 for each fluid to be injected . . . . When water is injected into the well, the injected water is taken out of the surrounding medium.

The fluid is injected through the central vertical passage 44 (FIG. 3) aligned with the well.

The above described remote control system 69 is used for controlling the continuous or intermittent working of the fluid injection means. In this case, the electrical generator which is necessary for the remote control need not to be a wind-driven generator or a solar panels assembly. The necessary electrical energy may be generated by means of the energy delivering means provided on the platform 6, such as a Diesel motor.

FIGS. 6 to 10 illustrate the installation and removal of the system according to the invention.

The installation of connecting device 1 on well head 3 and self-supporting pipeline 4 is effected by a semi-submersible platform 90 or a conventional drilling ship, because platform 6, ballasted by filing compartment 64, is brought to the planned location by a small ship (FIG. 6).

For positioning purposes the ballast is removed from platform 6 and it is manoeuvered by means of boat 91 and optionally platform 90 (FIG. 7).

The connection of platform 6 to pipeline 4 is effected by means of the cone assembly device 51,52 and the ballasting of platform 6. As soon as attachment takes place connector 5 is operated, for example hydraulically, and the system is then operational (FIG. 8).

The flexible joint 16, together with the flexible joint advantageously provided at the level of the connection between the pipeline 4 and the platform 6, make it possible to have a relatively important angular shift between the well head and the platform.

When it is desired to remove the system connector 5 is operated and the ballast is removed from platform 6 in order to separate the latter from pipeline 4 (FIG. 9).

The platform is then removed by means of a small ship 92, whilst a semi-submersible platform 93 is moved in to remove pipeline 4 and optionally carry out important work on the well.

The invention is not limited to the embodiments described and represented herein before and various modifications can be made thereto without passing beyond the scope of the invention.

What is claimed is:

1. In an installation for extracting oil from an underwater oil field, and comprising at least one submerged wellhead mounted on a satellite well, and improved system for the remote control and maintenance of said satellite wellhead, said system comprising:
   a surface non-submerged platform located substantially vertically of said satellite wellhead, and supporting equipment usable for the remote control and maintenance of said satellite wellhead, said equipment comprising a reception circuit and a remote control unit provided with a remote control power source and responsive to signals received by said reception circuit to remotely control said satellite wellhead;
   a wellhead control device located adjacent said satellite wellhead;
   at least one remote control line connecting said remote control unit to said control device;
   at least one pipeline connecting said platform to said wellhead;

a connection for connecting said pipeline to said platform; and a spherical articulation connecting said pipeline to said satellite wellhead and comprising at least one stack of alternating layers of a rigid material and elastic material which are adhered to each other and are disposed in accordance with spherical surfaces.

2. A system as set forth in claim 1 wherein said spherical articulation is rigidly connected to the satellite well structure and is vertically slidably mounted with respect to said satellite wellhead.

3. A system as set forth in claim 1 wherein said remote control unit is a hydraulic unit and includes a hydraulic power source.

4. A system as set forth in claim 1 wherein said platform supports means for injecting fluid into the satellite well through said pipeline.

5. A system as set forth in claim 1 wherein said pipeline is connected to said platform by means of a connection including a cone assembly device.

6. A system as set forth in claim 1 comprising a plurality of pipelines connected to respective grouped satellite wellheads and to said platform.

7. A system as set forth in claim 1 wherein said equipment comprises means for working with a cable in the satellite well through said pipeline.

8. A system as set forth in claim 7 wherein said platform further supports storing means for storing fluids to be injected into the satellite well.

* * * * *